(12) United States Patent
Cookson (10) Patent No.: US 8,689,235 B2
(45) Date of Patent: Apr. 1, 2014

(54) SYSTEM AND METHOD FOR ENABLING INTERACTION BETWEEN A CLOUD APPLICATION AND A LOCAL APPLICATION

(75) Inventor: Gard B. Cookson, Chatsworth, CA (US)

(73) Assignee: GBC Industries, Burbank, CA (US)

( * ) Notice: Subject to any disclaimer, the term of this patent is extended or adjusted under 35 U.S.C. 154(b) by 104 days.

(21) Appl. No.: 13/008,791

(22) Filed: Jan. 18, 2011

(65) Prior Publication Data

US 2012/0185874 A1    Jul. 19, 2012

(51) Int. Cl.
*G06F 13/00*    (2006.01)

(52) U.S. Cl.
USPC .......................................... 719/313; 719/314

(58) Field of Classification Search
CPC .................... G06F 9/54; G06F 9/546
See application file for complete search history.

(56) References Cited

U.S. PATENT DOCUMENTS

| 7,519,689 | B2 | 4/2009 | Mohan et al. |
| 7,660,875 | B2 | 2/2010 | Hilt et al. |
| 2005/0221898 | A1 | 10/2005 | Gatto et al. |
| 2006/0075069 | A1 | 4/2006 | Mohan et al. |
| 2008/0065649 | A1 | 3/2008 | Smiler |
| 2008/0306873 | A1 | 12/2008 | Howard et al. |
| 2009/0222925 | A1 | 9/2009 | Hilaiel et al. |
| 2009/0271707 | A1 | 10/2009 | Lin et al. |
| 2010/0115159 | A1 | 5/2010 | Cookson |
| 2010/0268764 | A1 | 10/2010 | Wee et al. |
| 2012/0030672 | A1* | 2/2012 | Zygmuntowicz et al. ........ 718/1 |
| 2012/0143944 | A1* | 6/2012 | Reeves et al. ................. 709/203 |
| 2012/0216133 | A1* | 8/2012 | Barker et al. ................. 715/760 |

FOREIGN PATENT DOCUMENTS

WO    WO2008306873    10/2008

* cited by examiner

*Primary Examiner* — Andy Ho
(74) *Attorney, Agent, or Firm* — Sheppard, Mullin, Richter & Hampton LLP (57) ABSTRACT

A system and method for enabling interaction between one or more cloud applications and one or more local applications is provided. A web page of a cloud application is displayed on a web browser. The URL of the web page of the cloud application is extracted and analyzed. In other embodiments, the title or other metadata of the web page of the cloud application can be extracted and analyzed. An invoking application analyzes the URL, title, or other metadata to determine whether a local application is compatible with the cloud application. If it is determined that the local application is compatible, then the local application is activated to enable its interaction with the cloud application, and the functionalities of the local application may be used over the cloud application.

23 Claims, 5 Drawing Sheets

SYSTEM AND METHOD FOR ENABLING INTERACTION BETWEEN A CLOUD APPLICATION AND A LOCAL APPLICATION

BACKGROUND

The present invention relates, in general, to cloud computing. More specifically, the present invention relates to a system and method for enabling interaction between one or more cloud applications and one or more local applications.

Cloud computing is an Internet-based method of computing in which various resources are provided to users over the Internet from a "cloud." A cloud is a group of servers containing various resources that are hosted by a third party. The servers are computer hardware running computer software products that are designed to deliver the various resources to the users.

The resources may comprise various types of software applications. Specific examples of resources include Gmail, Adobe Buzzword, Microsoft Office, and similar software applications. Software applications available from the cloud are referred to as cloud applications. The cloud applications are retrieved by the user on a data processing unit via Internet or another wide area network ("WAN"), or via an intranet or other local area network ("LAN"). Examples of data processing units include desktops, laptops, cell phones, and other computing systems.

Cloud computing is a relatively new concept that is being rapidly adopted worldwide. More and more people and organizations are shifting to cloud computing from the traditional client-server and peer-to-peer computing. The traditionally available computing models have high hardware and software demands on the user's side, leading to increased computing costs. For example: in an organization having many people, if each person need to work with Microsoft Office, then the organization traditionally would need to install Microsoft Office on each and every user's data processing unit. Installing and maintaining software on multiple data processing units can become burdensome.

Cloud computing can help ease this burden and reduce an organization's computer infrastructure requirements. Other advantages of cloud computing include the following:

1. Cloud computing systems give organizations single-point access to computer applications. Companies no longer have to buy a set of software or software licenses for each and every user. Instead, the company may acquire the software or software licenses by paying a metered fee to a cloud computing company or cloud service provider. Examples of cloud service providers include Microsoft, Salesforce, Skytap, HP, IBM, Amazon, and Google.
2. Organizations can save money on information technology ("IT") support. The streamlined hardware requirements of cloud-networked machines generally have fewer problems than a network of heterogeneous machines and operating systems.

Because of the many advantages, it is likely that more and more software applications will be offered through cloud computing.

There are many specially designed local applications that provide value-added services to be used in conjunction with software applications. These specially designed local applications, however, are unable to interact with software applications when they are accessed through the cloud. This inability arises from the fact that software applications offered through a cloud network are accessed via a web browser. The operating system sees the web browser, not the software application running within the web browser.

An example of a specially designed local application that provides value-added services to be used in conjunction with a software application is Bella Corporation's virtual keyboard, which displays shortcut keys tailored to the software application on a user's computer monitor. Bella Corporation's virtual keyboard is disclosed in U.S. Patent Application Publication No 2010/0115159, which is incorporated herein by reference.

In light of the foregoing discussion, there is a need for a system and method for enabling interaction between a local application, such as a local application that provides value-added services, and a software application offered through a cloud network and running on a web browser. The present invention satisfies this and other needs.

SUMMARY

An object of the present invention is to provide a system and method for enabling interaction between one or more cloud applications and one or more local applications.

Another object of the present invention is to provide a system and method for enabling access of one or more functionalities of one or more local applications over one or more cloud applications.

In an embodiment of the present invention, a method for enabling interaction between a cloud application and a local application residing in a user's local data processing unit is provided. The cloud application is accessed via a web browser residing in the local data processing unit when a URL of the cloud application is received in an address bar of the web browser from the user. Thereafter, a web page associated with the cloud application is displayed on the web browser. Information, such as the URL, title, or other metadata from the webpage, is extracted and analyzed by an invoking application related to the local application residing in the local data processing unit. The invoking application analyzes the information extracted from the webpage and determines whether the local application is compatible with the cloud application. If it is determined that the local application is compatible with the cloud application, then the local application is activated, and interaction is enabled between the local application and the cloud application.

In another embodiment of the present invention, a system for enabling interaction between a cloud application residing in a cloud network and a local application residing in a user's local data processing unit is provided. The system includes a web browser for receiving a web page of the cloud application. The system also it includes an invoking application associated with the local application. The invoking application extracts and analyzes information, such as URL, title or other metadata, from the webpage of the cloud application. The invoking application then determines whether the cloud application is one with which the local application is compatible. If so, then the invoking application activates the local application, enabling interaction between the local application and the cloud application.

The system and method of the present invention allow the functionalities of existing local applications to be used with applications, such as Microsoft Office, which are now being provided from a cloud network.

Other features and advantages should become apparent from the following description of the preferred embodiments, taken in conjunction with the accompanying drawings, which illustrate, by way of example, the principles of the invention.

BRIEF DESCRIPTION OF THE DRAWINGS

Various embodiments of the present invention will now be described, by way of example only, with reference to the following drawings.

DETAILED DESCRIPTION OF THE INVENTION

Embodiments of the present invention provide a system, method, and computer program product for enabling interaction between a cloud application and a local application residing in a user's local data processing unit. The cloud application is accessed via a web browser residing in the local data processing unit. In the description herein for embodiments of the present invention, numerous specific details are provided, such as examples of components and mechanisms, to provide a thorough understanding of various embodiments of the present invention. One skilled in the relevant art will recognize, however, that an embodiment of the present invention can be practiced without one or more of the specific details, or with other systems, assemblies, methods, components, materials, parts, and the like. In other instances, well-known structures, materials, or operations are not specifically shown or described in detail to avoid obscuring aspects of the embodiments of the present invention.

In one embodiment, the present invention provides a method comprising (a) receiving a web page associated with the cloud application on the web browser; (b) extracting information from the web page; (c) analyzing the extracted information to determine the compatibility of the local application with the cloud application; and (d) enabling interaction between the cloud application and the local application if a determination of compatibility is made. The step of analyzing the extracted information may comprise searching a database for a match with the extracted information.

In a particular embodiment, the step of extracting information comprises extracting a URL. The step of analyzing the extracted information comprises searching a database for a match with the extracted URL.

In a further embodiment, the information is extracted by an invoking application residing in the local data processing unit. The invoking application may be a plugin in the web browser, a part of the local application, or a standalone application.

In one embodiment, the step of analyzing the extracted information comprises searching a database containing a list of cloud applications with which the local application is compatible.

In describing the embodiments of the present invention, reference will be made to FIGS. 1-4 of the drawings, in which like numerals refer to like features of the invention. Features of the invention are not necessarily shown to scale in the drawings.

Network System

Figure 1:
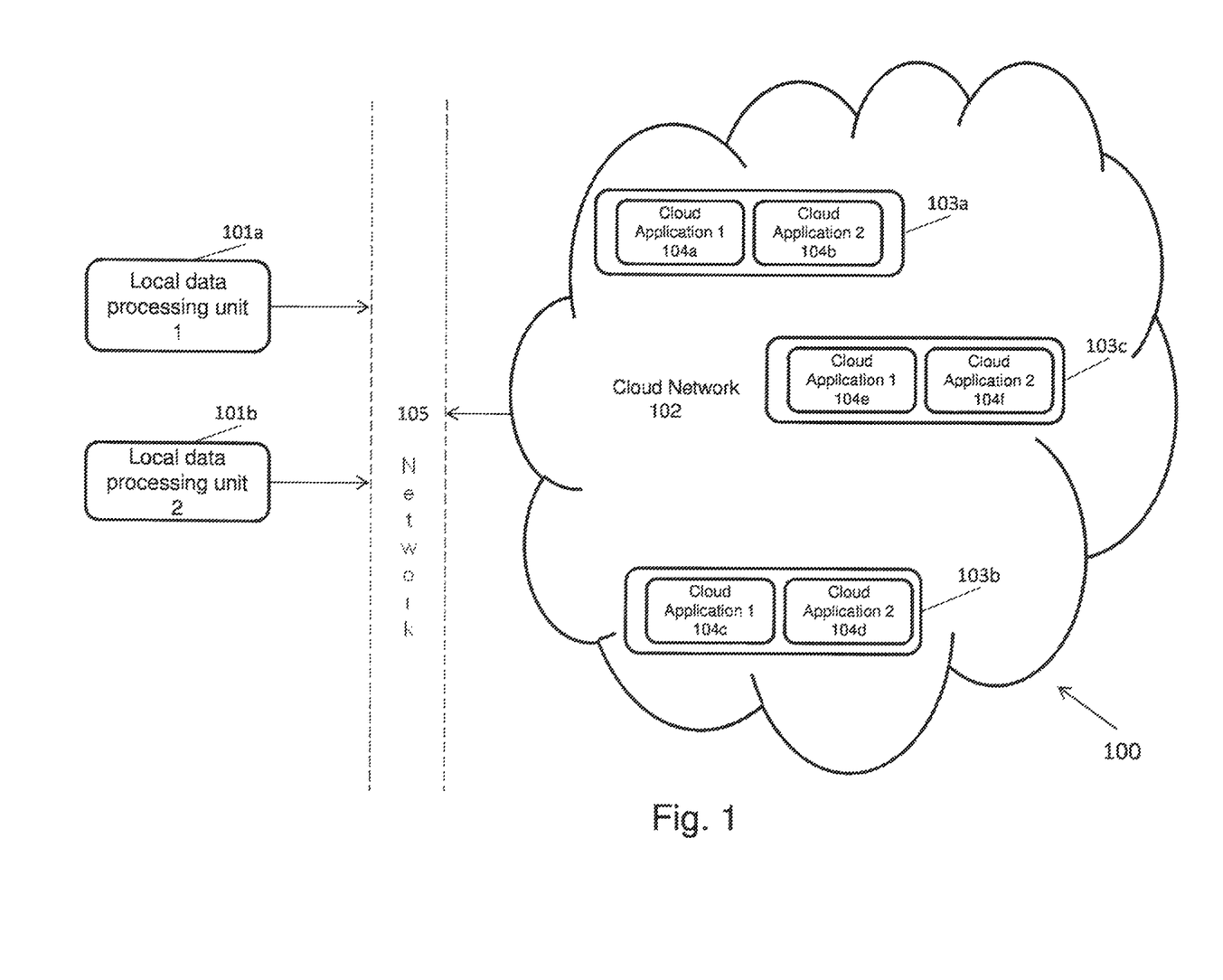
FIG. 1 is a block diagram illustrating a computer network in accordance with an embodiment of the present invention.

With reference now to the illustrative drawings, and particularly to FIG. 1, there is shown a block diagram illustrating a network 100 in accordance with an embodiment of the present invention. Network 100 includes a local data processing units 101a and 101b; cloud network 102; cloud data processing units 103a, 103b and 103c; cloud applications 104a, 104b, 104c, 104d, 104e and 104f; and a wide area network 105, such as the Internet. In other embodiments, the wide area network may be replaced with a local area network, such as an intranet.

The cloud network 102 comprises hardware, software, and/or firmware generally operative to connect the cloud data processing units 103 to the wide area network 105.

Each cloud data processing unit 103 comprises hardware, software, and/or firmware generally operative to host one or more cloud applications 104. As shown in the embodiment of FIG. 1, the cloud data processing unit 103a includes cloud applications 104a and 104b, the cloud data processing unit 103b includes cloud applications 104c and 104d, and the cloud data processing unit 103c includes cloud applications 104e and 104f. Examples of cloud applications 104 include, but are not limited to Adobe Buzzword, Gmail, and Microsoft Office.

One or more users can access one or more cloud applications 104 through one or more local data processing units 101a and 101b. Each local data processing unit comprises hardware, software, and/or firmware generally operative to run a browser capable of presenting a cloud application to a user via an output device, such as a computer monitor, and receiving input for the cloud application from the user via an input device, such as a computer keyboard or mouse. Examples of local data processing units 101 include, but are not limited to personal computers, laptops, mobile phones, personal digital assistants (PDAs), Global Positioning System (GPS) navigation devices, mobile Internet devices (e.g., communicators), automatic teller machines (ATMs), arcade games, and digital diaries.

Communication between the local data processing units 101 and the cloud network 102 is achieved via the network 105. Examples of suitable networks for the network 105 include a wide area network (such as the Internet), a local area network (such as an intranet), a WiFi system, and a general packet radio service (GPRS).

Components of Local Data Processing Unit

Figure 2:
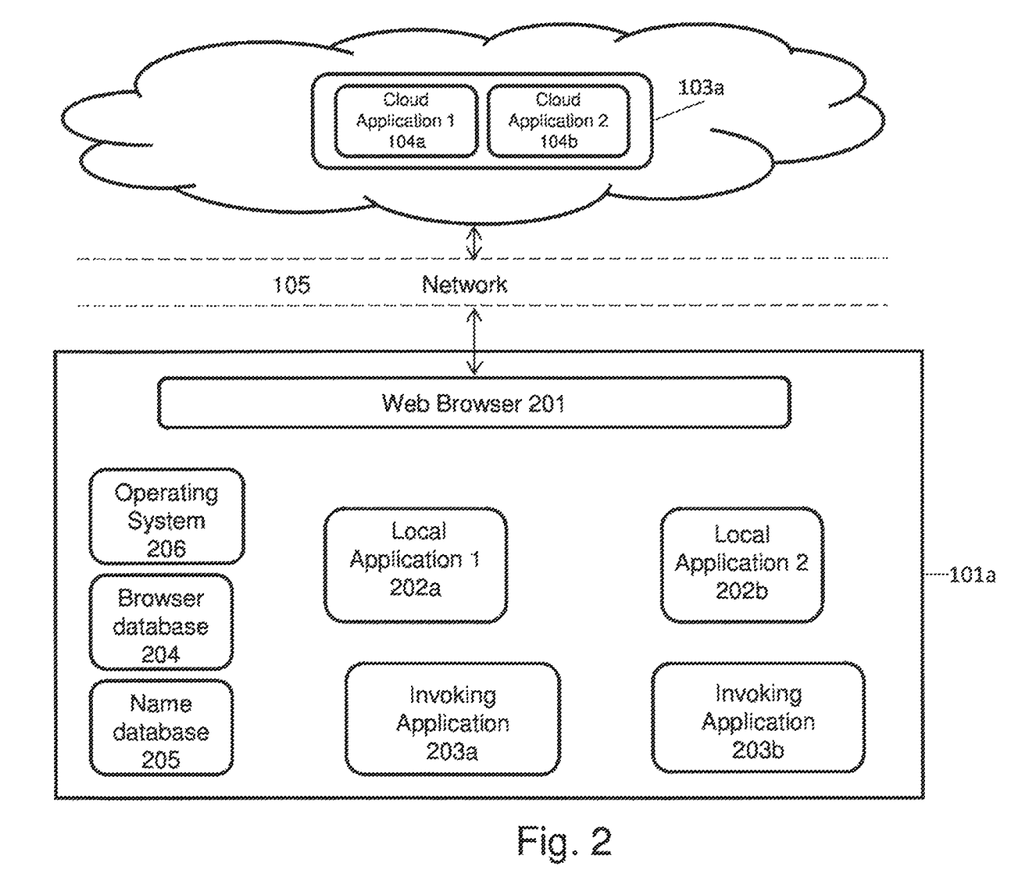
FIG. 2 is a block diagram illustrating the components of a first embodiment of a local data processing unit for the computer network of FIG. 1.

With reference now to FIG. 2, there is shown a block diagram illustrating the components of a first embodiment of a local data processing unit 101a for the computer network 100 of FIG. 1. The local data processing unit 101a includes a web browser 201, local applications 202a and 202b, invoking applications 203a and 203b, a browser database 204 containing a list of cloud applications, a name database 205 containing a list of data (such as words or phrases) related to the URL, title or metadata of various cloud applications, and an operating system 206.

The web browser 201 comprises hardware, software, and/or firmware generally operative to present a cloud application to a user via an output device, such as a computer monitor, and to receive input for the cloud application from the user via an input device, such as a computer keyboard or mouse.

Examples of suitable web browsers include Microsoft Explorer, Mozilla Firefox, and Apple Safari.

Each local application 202 is configured provide a value-added service to be used in conjunction with another software application, which traditionally would be hosted by the local data processing unit itself. Examples of local applications 202 include, but are not limited to, Winamp, Windows Media Player, and Bella Corp's virtual keyboard as described in U.S. Patent Application Publication No. 2010/0115159, which is incorporated herein by reference.

Each local application 202 may have an associated invoking application 203, described further below. In one embodiment, multiple local applications 202 share the same associated invoking application.

The browser database 204 and name database 205 are associated with the invoking applications 203. They are installed in the local data processing unit 101a with the installation of one of the invoking applications on the local data processing unit. These databases may be subsequently updated with additional information during the installation of a subsequent new invoking application in the users local data processing unit, as well as during the installation of a subsequent new local application 202 in the user's local data processing unit, provided that the subsequent new local application is compatible with one of the existing invoking applications.

In accordance with an embodiment of the present invention, the browser database 204 contains a list of web browsers with which one or more of the invoking applications 203 is compatible. When a user launches a web browser, such as the web browser 201, on the local data processing unit 101a, each invoking application 203 may query the browser database to see whether the web browser is one that is supported by the invoking application.

In accordance with an embodiment of the present invention, the name database 205 contains a list of words, phrases, or other data related to the URLs, keywords, or other metadata of various cloud applications with which one or more of the local applications 202a and 202b is compatible. When a user opens a cloud application, such as a cloud application 104, using the web browser 201, each invoking application 203 may query the name database to see whether the cloud application is one that a local application 202 supports.

The browser database 204 and name database 205 may be updated during the installation of a new local application 202 or new invoking application 203. For example, the list of web browsers in the browser database 204 may be updated with a new web browser that is compatible with a new invoking application. Similarly, the list contained in the name database may be updated with a data related to a new cloud application with which a new local application is compatible.

In accordance with an embodiment of the present invention, wherein one or more local applications 202a and 202b have associated invoking applications 203a and 203b, each of the invoking applications has its own associated browser database and name database. In another embodiment, the invoking applications share a common browser database and a common name database.

In one embodiment of the present invention, each invoking application 203 is a part of an associated local application 202, so that the functionality of the invoking application is provided by the local application itself. In another embodiment of the present invention, each invoking application is an independent application associated with one or more local applications. In yet another embodiment of the present invention, each invoking application is a plug-in residing within the web browser 201 and associated with one or more local applications.

In operation, a user, using a local data processing unit 101, communicates with a cloud data processing unit 103 via the web browser 201 and network 105 to access a cloud application 104. In one embodiment, the user enters the URL associated with a cloud application 104, and the associated cloud data processing unit transmits a web page to be displayed on an output device of the local data processing unit via the web browser 201. The communication process will be explained in detail in conjunction with the flow diagrams depicted in FIGS. 3A and 3B.

Method for Enabling Interaction

Figure 3A:
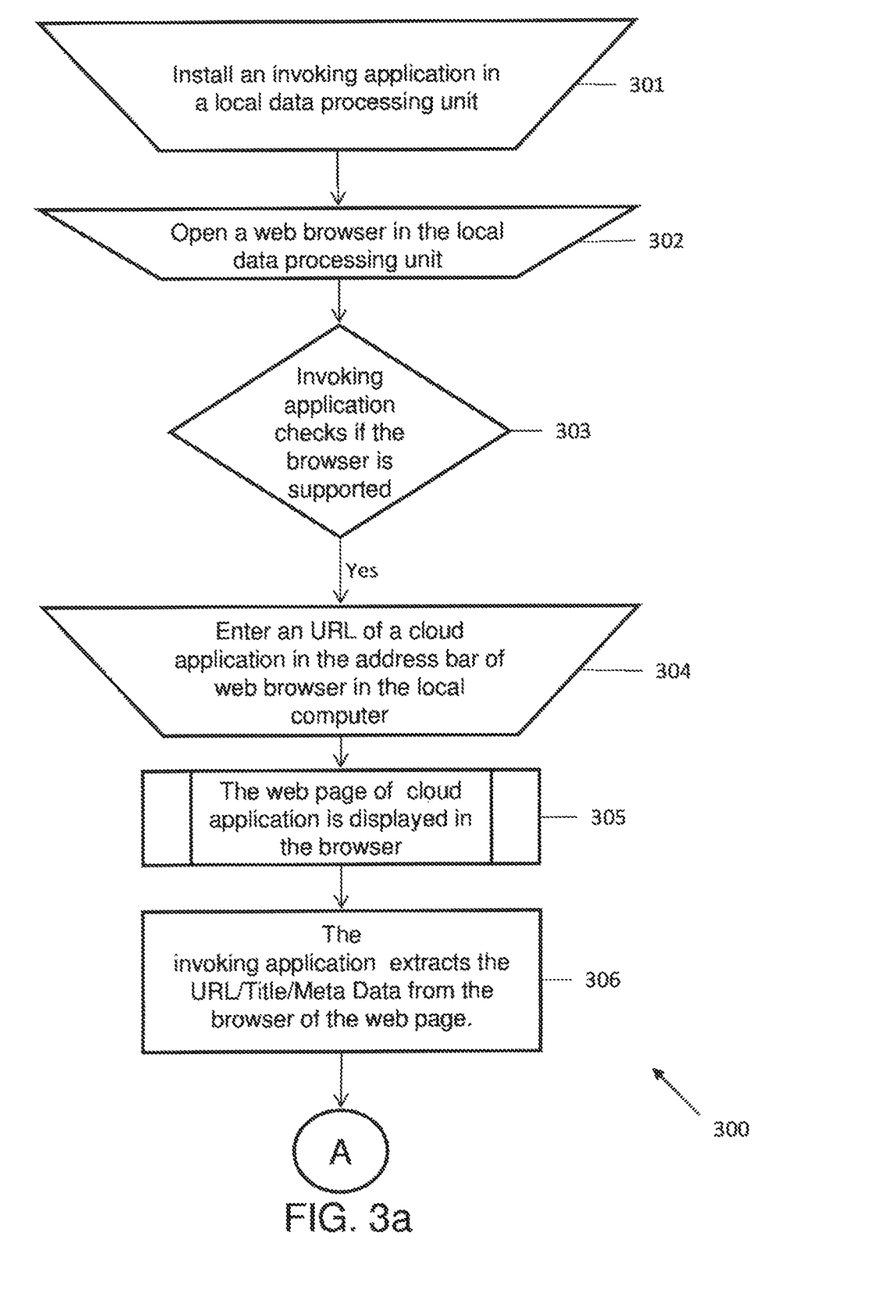
FIGS. 3A and 3B are flow diagrams illustrating a method for enabling interaction between a cloud application and a local application residing in a user's local data processing unit, in accordance with an embodiment of the present invention.
Figure 3B:
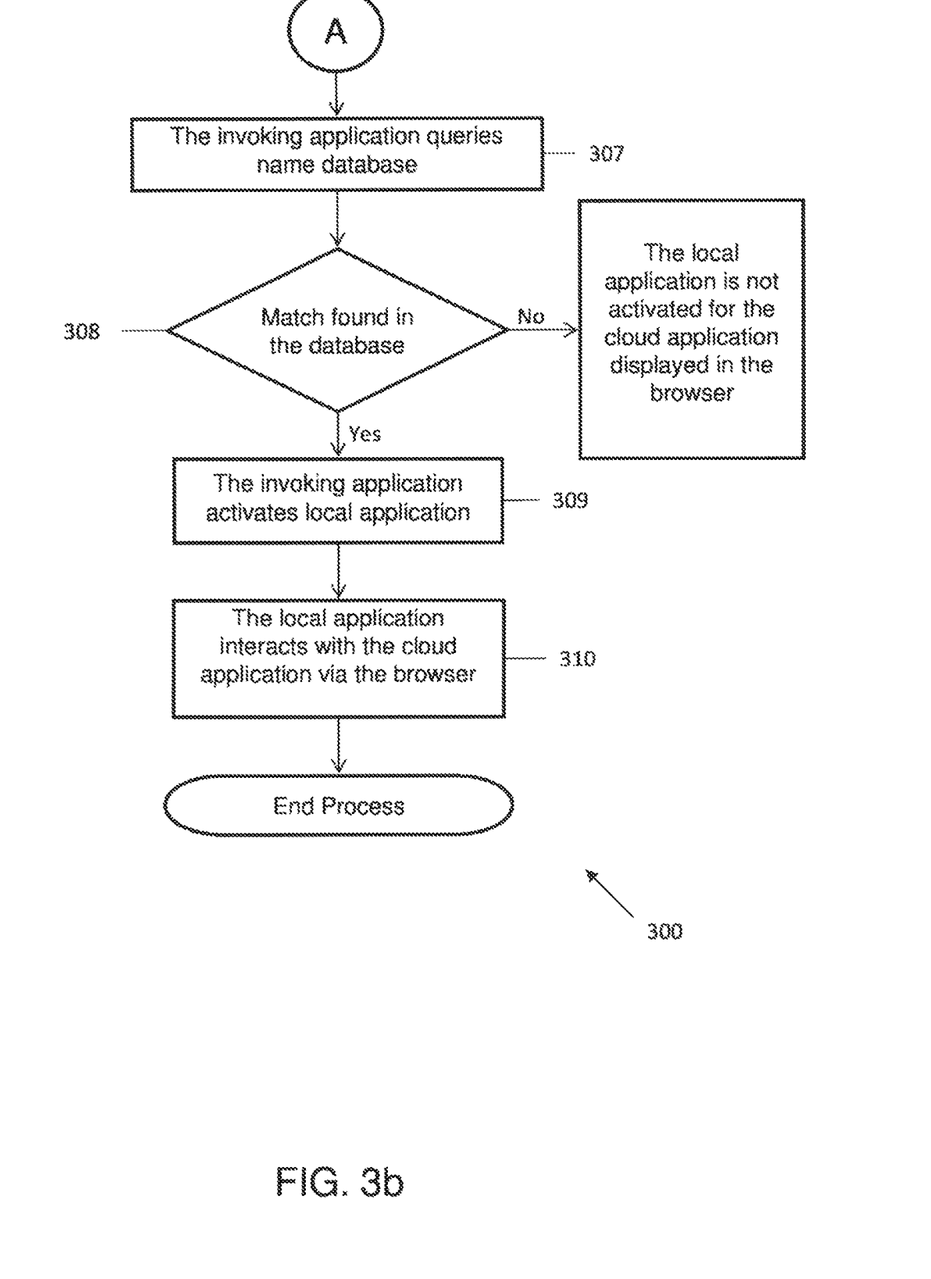

With reference to FIGS. 3A and 3B, there are shown flow diagrams illustrating a method 300 for enabling interaction between a cloud application 104 and a local application 202 residing in a user's local data processing unit 101a, in accordance with an embodiment of the present invention. At step 301, a user installs an invoking application 203 associated with a local application 202 in the local data processing unit. At step 302, the user opens a web browser 201 in the local data processing unit. At step 303, the invoking application checks the browser database 204 to see whether the opened browser is supported. If the opened browser matches a browser listed in the browser database, then the method proceeds to step 304. If the opened browser does not match a browser listed in the browser database, then the method returns to step 302 and waits for the user to open another web browser.

Once it is determined in step 303 that the web browser 201 is supported, the user enters the URL of one of the cloud applications 104 in the address bar of the web browser 201 at step 304. The user may enter the URL, for example, by typing the URL into the address bar, by selecting the browsers forward or backward buttons, by selecting an item from the browsers history or "favorites" lists, by selecting the browsers refresh or reload button, by selecting the browsers home button, by inputting text into a search bar, or by selecting a link on a displayed web page. At step 305, the web page of the desired cloud application 104 is displayed by the web browser 201.

At step 306, the invoking applications 203a and 203b extract the URL from the web browser 201. In one embodiment, the invoking applications extract the URL as entered by the user. In another embodiment, the invoking applications extract the URL as ultimately displayed in the address bar of the web browser. The URL as entered and the URL as ultimately displayed may differ because of rerouting by one or more of the cloud data processing units 103. In a further embodiment, the invoking applications 203a and 203b additionally or alternatively extract the title or other metadata of the web page displayed by web browser 201.

At step 307, the invoking applications 203a and 203b query the name database 205. The name database contains a list of words, phrases, or other data related to the URLs, keywords or other metadata of various cloud applications with which one or more of the local applications 202a and 202b is compatible.

In step 308, the invoking applications 203a and 203b check to see whether the extracted URL, title, or other metadata of the web page displayed by web browser 201 has a match in the name database 205. If an invoking application finds a match in the name database, then it is determined that the local application 202 associated with the invoking application can be used with the cloud application 104 being displayed by the web browser. The method 300 then proceeds to step 310. If no match is found, then it is determined that none of the associated local applications can be used with the cloud application being displayed by the web browser, and no local applications are activated. The method can then return to step 304 and wait for the user to enter another URL in the address bar of the web browser. In one embodiment, the match need not be an exact match. For example, it may suffice that the domain name portion of the URL has a match in the name database.

At step 310, one or more of the invoking applications 203 activates its respective local application 202. At step 311, the activated local application begins interacting with the cloud application 104. The user is able to use the functionalities of the activated local application with the cloud application displayed in the web browser 201.

In an exemplary embodiment, consider that the user wants to use the functionalities of Bella Corporation's virtual keyboard with the cloud application version of Microsoft Word. The user begins by opening a web browser 201 in the local data processing unit 101a. Once it is determined that the web browser 201 is supported, as described above, the user opens Microsoft Word on the web browser 201 by inputting the relevant URL into the address bar of the web browser. The local application (i.e., the virtual keyboard application) resides in the local data processing unit 101a of the user. The local application has an associated invoking application 203 that extracts the URL from the web browser, analyzes the extracted URL (e.g., by querying the name database 205 for a match), and activates the virtual keyboard application. After the virtual keyboard application is activated, it can interact with the cloud application version of Microsoft Word, and the functionalities of the virtual keyboard application can be used with a Microsoft Word document displayed by the web browser.

A user can have a plurality of local applications 202 installed on the user's local data processing unit 101a. It is not necessary that all local applications installed in the local data processing unit have a utility for a cloud application 104. In one embodiment, one or more of the invoking applications 203 has an evaluation module comprising hardware, software, and/or firmware generally operative to evaluate the utility and compatibility of various local applications with various cloud applications. If the evaluation module determines that a particular local application is useful and compatible with a particular cloud application, then the invoking application can add that information to the name database 205.

General Purpose Computer System

The present invention is implemented on various data processing units. A data processing unit may be any computer system, such as a personal computer, a laptop computer, a mobile phone, and the like, as described above.

Figure 4:
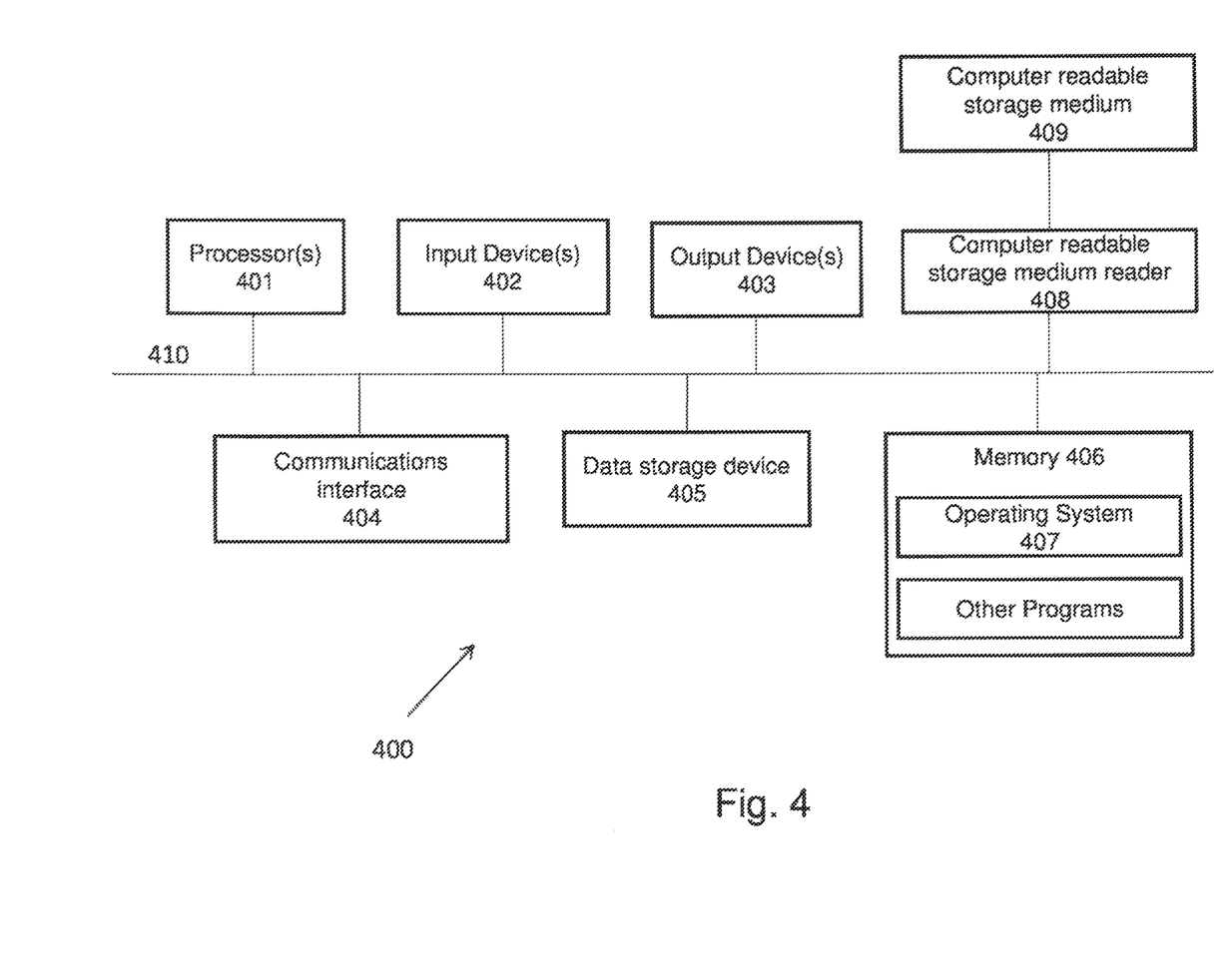
FIG. 4 is a block diagram illustrating a general purpose computer system for use in the embodiments of the present invention.

With reference to FIG. 4, there is shown a block diagram of a computer system 400. The computer system 400 includes a processor 401, such as an Intel Pentium® microprocessor or a Motorola Power PC® microprocessor, coupled to a communications channel 410. The computer system 400 further includes an input device 402 (such as a keyboard or mouse), an output device 403 (such as a liquid crystal display or a cathode ray tube display), a communication interface 404, a data storage device 405 (such as a magnetic or optical disk), and memory 406 (such as random access memory (RAM)), each coupled to the communications channel 410. The communication interface 404 may be coupled to the network 105 as shown in FIG. 2. One skilled in the art will recognize that although the data storage device 405 and memory 406 are shown as different units, the data storage device 405 and memory 406 may be parts of the same unit, distributed units, virtual memory, etc. Further, it will be appreciated that the term "memory" herein is intended to cover all data storage media, whether permanent or temporary.

The data storage device and/or the memory may also store an operating system 407 such as Microsoft Windows 7, Linux, the IBM OS/2 operating system, the MAC OS, or the UNIX operating system. It will be appreciated that embodiments of the present invention may also be implemented on platforms and operating systems other than those mentioned. An embodiment of the present invention may be written using JAVA, C, C++ language, and/or other programming languages, possibly using object oriented programming methodology. The present invention may be built on Ruby on Rails or using Ajax.

One skilled in the art will recognize that the computer system 400 may also include additional components, such as network connections, additional memory, additional processors, local area networks (LANs), and input/output lines for transferring information across a hardware channel, the Internet or an intranet. One skilled in the art will also recognize that the programs and data may be received by and stored in the computer system 400 in alternative ways. For example, a computer-readable storage medium (CRSM) reader 408, such as a magnetic disk drive, hard disk drive, magneto-optical reader, or CPU, may be coupled to the communications channel 410 for reading a computer-readable storage medium (CRSM) 409, such as a magnetic disk, a hard disk, a magneto-optical disk, or RAM.

The foregoing description of the preferred embodiments of the present invention is by way of example only and other variations and modifications of the above-described embodiments and methods are possible in light of the foregoing teaching. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application-specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method for enabling interaction between a cloud application and a local virtual keyboard application residing in a local data processing unit, the cloud application being accessed via a web browser residing in the local data processing unit, the method comprising:
    a) receiving a web page associated with the cloud application on the web browser;
    b) extracting information from the web page;
    c) analyzing the extracted information to determine the compatibility of the local virtual keyboard application with the cloud application; and
    d) enabling interaction between the cloud application and the local virtual keyboard application if a determination of compatibility is made;
    wherein the determination of compatibility comprises determining whether the local virtual keyboard application is able to support the cloud application; and
    wherein enabling interaction between the cloud application and the local virtual keyboard application comprises causing the local virtual keyboard application to run in conjunction with the cloud application to provide additional functionality to the cloud application.

2. The method of claim 1, wherein the step of analyzing the extracted information comprises searching a database for a match with the extracted information.

3. The method of claim 1, wherein the step of extracting information comprises extracting a URL.

4. The method of claim 3, wherein the step of analyzing the extracted information comprises searching a database for a match with the extracted URL.

5. The method of claim 1, wherein, in the step of extracting information, the information is extracted by an invoking application residing in the local data processing unit.

6. The method of claim 5, wherein the invoking application is a plugin in the web browser.

7. The method of claim 5, wherein the invoking application is a part of the local virtual keyboard application.

8. The method of claim 1, wherein the step of analyzing the extracted information comprises searching a database containing a list of cloud applications with which the local virtual keyboard application is compatible.

9. A system for enabling interaction with a cloud application accessed via a web browser residing in a local data processing unit, the web browser receiving a web page associated with the cloud application, the system comprising:
   a) a local virtual keyboard application; and
   b) an invoking application associated with the local virtual keyboard application;
   c) wherein the invoking application is configured to extract information from the web page;
   d) wherein the invoking application is further configured to analyze the extracted information to determine the compatibility of the local virtual keyboard application with the cloud application;
   e) wherein the invoking application is further configured to enable interaction between the cloud application and the local virtual keyboard application if a determination of compatibility is made;
   f) wherein the determination of compatibility comprises determining whether the local virtual keyboard application is able to support the cloud application; and
   g) wherein enabling interaction between the cloud application and the local virtual keyboard application comprises causing the local virtual keyboard application to run in conjunction with the cloud application to provide additional functionality to the cloud application.

10. The system of claim 9, wherein the invoking application is configured to analyze the extracted information by searching a database for a match with the extracted information.

11. The system of claim 9, wherein the invoking application is configured to extract a URL from the web page.

12. The system of claim 11, wherein the invoking application is configured to analyze the extracted URL by searching a database for a match with the extracted URL.

13. The system of claim 9, wherein the invoking application is a part of the local virtual keyboard application.

14. The system of claim 9, wherein the invoking application is a plugin in the web browser.

15. The system of claim 9, wherein the invoking application is configured to analyze the extracted URL by searching a database containing a list of cloud application with which the local virtual keyboard application is compatible.

16. A computer program product for use with a computer, the computer program product comprising a non-transitory computer-readable storage medium having a computer-readable program code embodied therein for enabling interaction between a cloud application and a local virtual keyboard application residing in a local data processing unit, the cloud application being accessed via a web browser residing in the local data processing unit, the computer-readable program code performing the steps of
   a) receiving a web page associated with the cloud application on the web browser;
   b) extracting information from the web page;
   c) analyzing the extracted information to determine the compatibility of the local virtual keyboard application with the cloud application; and
   d) enabling interaction between the cloud application and the local virtual keyboard application if a determination of compatibility is made;
   wherein the determination of compatibility comprises determining whether the local virtual keyboard application is able to support the cloud application; and
   wherein enabling interaction between the cloud application and the local virtual keyboard application comprises causing the local virtual keyboard application to run in conjunction with the cloud application to provide additional functionality to the cloud application.

17. The computer program product of claim 16, wherein the step of analyzing the extracted information comprises searching a database for a match with the extracted information.

18. The computer program product of claim 16, wherein the step of extracting information comprises extracting a URL.

19. The computer program product of claim 18, wherein the step of analyzing the extracted information comprises searching a database for a match with the extracted URL.

20. The computer program product of claim 16, wherein, in the step of extracting information, the information is extracted by an invoking application residing in the local data processing unit.

21. The computer program product of claim 20, wherein the invoking application is a plugin in the web browser.

22. The computer program product of claim 20, wherein the invoking application is a part of the local virtual keyboard application.

23. The computer program product of claim 16, wherein the step of analyzing the extracted information comprises searching a database containing a list of cloud applications with which the local virtual keyboard application is compatible.

* * * * *